Aug. 29, 1961  E. BÜHRER ET AL  2,997,757
FOUNDRY MOLD

Filed Aug. 28, 1957  7 Sheets-Sheet 1

INVENTORS:
ERWIN BÜHRER
WALTER GÖTZ
BY
Leon M. Strauss
AGT.

Aug. 29, 1961  E. BÜHRER ET AL  2,997,757
FOUNDRY MOLD

Filed Aug. 28, 1957  7 Sheets-Sheet 2

INVENTORS:
ERWIN BÜHRER
WALTER GÖTZ
BY

INVENTORS:
ERWIN BÜHRER
WALTER GÖTZ

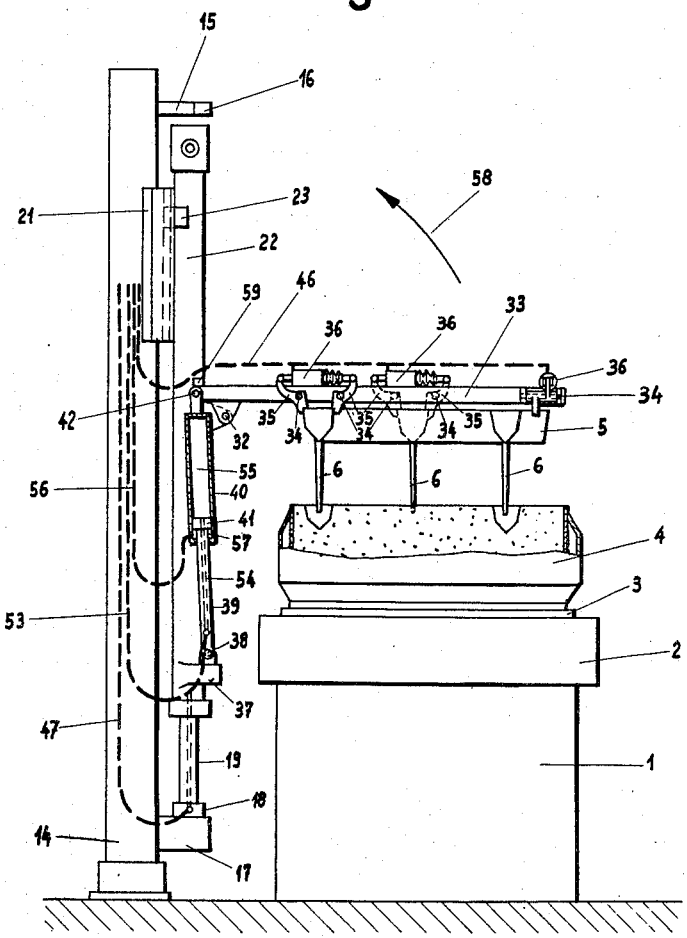

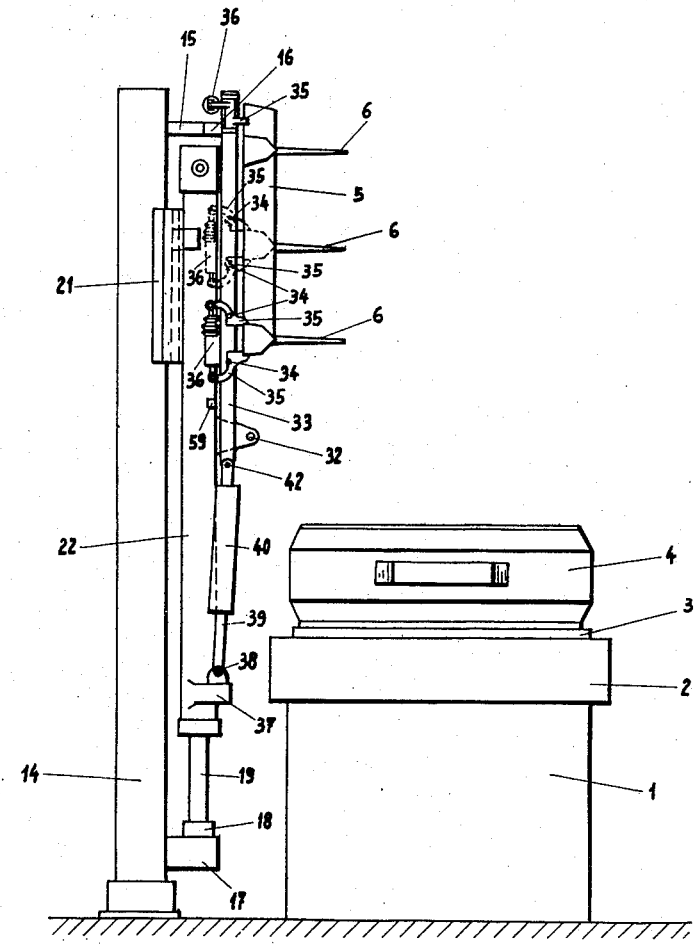

Aug. 29, 1961   E. BÜHRER ET AL   2,997,757
FOUNDRY MOLD
Filed Aug. 28, 1957   7 Sheets-Sheet 6
Fig. 9
Fig. 10
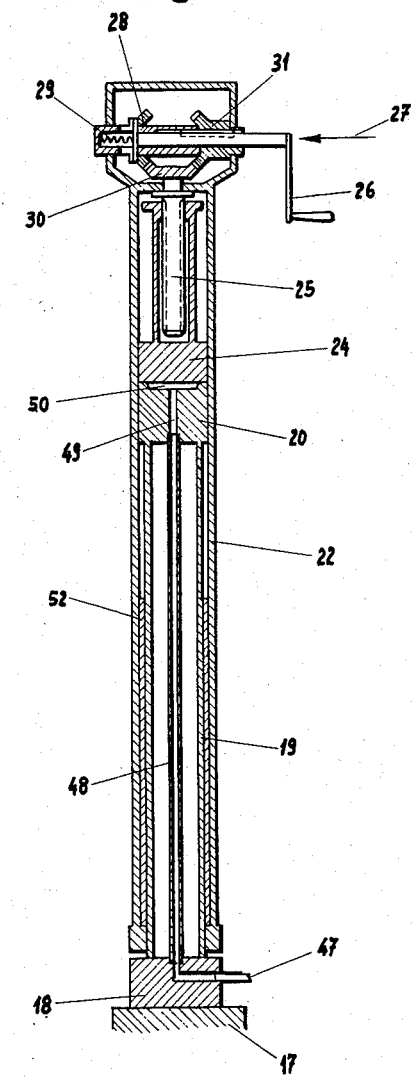
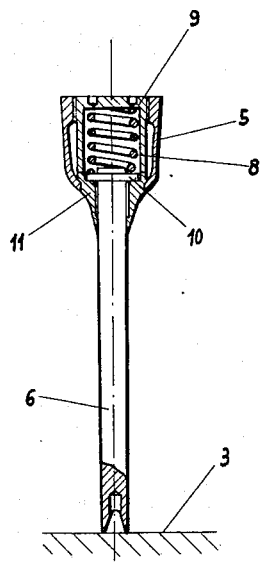
INVENTORS:
ERWIN BÜHRER
WALTER GÖTZ
BY
Leon H. Strauss
AGT.

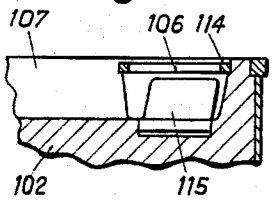
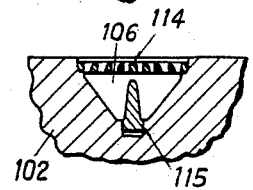
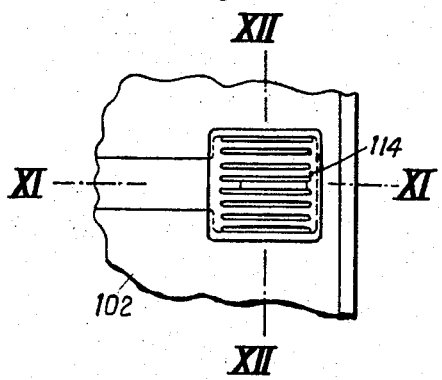
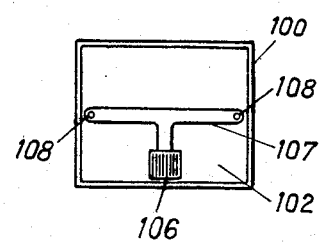
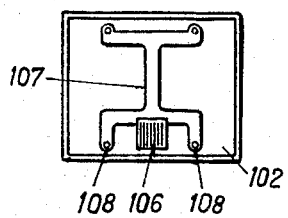
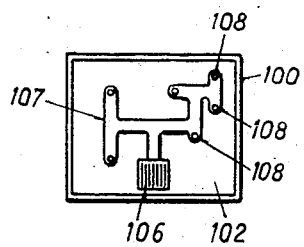

United States Patent Office 2,997,757
Patented Aug. 29, 1961

2,997,757
FOUNDRY MOLD
Erwin Bührer, 117 Alpenstrasse, and Walter Goetz, 41 Steigstrasse, both of Schaffhausen, Switzerland
Filed Aug. 28, 1957, Ser. No. 680,759
Claims priority, application Switzerland Aug. 28, 1956
9 Claims. (Cl. 22—134)

The present application is a continuation in part of our copending patent application, Serial No. 478,166, filed December 28, 1954, for Process and Means for Casting System for Operating Pouring Ladles, now U.S. Patent No. 2,892,225, granted June 30, 1959, with the priority of an application in Switzerland on June 23, 1954.

The present invention relates to a mold for foundry purposes and more patricularly to a mold having a parting plane defining a cope and a drag.

In recent years a tremendous effort has been made in the foundry industry to increase the production and at the same time to improve the quality of the castings. To this end a number of modifications in the conventional foundry practice have been proposed. However, none of these modifications has brought substantial improvements, due to the fact that a large number of requirements must be taken into consideration in order to permit production of high quality castings. In most cases it has been found impossible to meet all of these requirements thus making it impossible to insure a uniform high quality in all of the castings produced.

More specifically it has been suggested to increase the production by forming a subdivided mold. Whenever it becomes necessary, however, to fill such a subdivided mold having several pouring basins by pouring molten metal successively into the individual sprues, there arises a well-known danger that the second or third of these successive pouring operations may bring about an explosive combustion of the combustible gases present in the mold after the first pouring operation. These minor explosions are usually the cause for the formation of spoiled castings.

Recent investigations have, moreover, brought out how greatly all aspects of the pouring process are affected by the characteristics of the pouring basin, the sprues and the pouring speed. In conventional pouring procedures for small and medium-sized molds, the pouring basin is always of relatively small dimensions. It is, therefore, very difficult to direct the pouring jet to the proper spot and at the same time to pour the molten metal in such a manner that the pouring basin, from which the molten metal flows continuously into the mold, is at all times filled to the brim.

Furthermore, keeping the pouring basin of a system as described above filled is necessary for several reasons, one of which is that it is essential to prevent slag floating on the molten metal from flowing into the mold. Secondly, good foundry or pouring technique requires maintenance of a fluid pressure in the runner and gate system in order that the rate of flow of the metal therein as well as the pouring time may be properly controlled.

When one observes a pouring process where molds with such relatively small pouring basins are used, one soon realizes that the aforementioned conditions are not met very satisfactorily. Thus, sometimes the pouring jet flows properly into the pouring basin, and sometimes at least temporarily it hits the vertical sprue directly, in which latter case the metal is forced into the mold under excessive pressure, usually resulting in a spoiled casting. Then, too, it is very difficult for the caster or operator to stop the filling operation at the proper moment. Mostly it is interrupted too late, and the pouring stream which, at the moment that the mold is filled completely, still flows from the pouring ladle to the pouring basin fills the latter with an excessive, superfluous amount of metal. On the other hand, should the caster try to prevent overfilling at all costs, then the other undesirable condition results, i.e., the pouring basin becomes empty too soon, thus permitting the slag to enter the mold freely.

In such cases as just described, the castings are often permeated with residues of slag that managed to enter. Therefore, it is quite generally necessary to provide for so-called slag runners in the runner system which, if of a sufficiently large cross-sectional area, by their serrated structure more or less restrict the undesired flow of slag. This, however, results in a much reduced yield of the pattern plate.

Another drawback of the conventional pouring method, particularly evident in the case of molds with several sprue openings, is that the pouring basins cannot always be laid out close to the edge of the molding box or flask, so that pouring of the molten metal with conventional equipment is only possible from a great height and consequently with a long, uncontrollable pouring jet.

It is therefore an object of the present invention to provide means facilitating casting procedures whereby a plurality of mold cavities may be safely filled and a plurality of faultless castings produced simultaneously from a single, predetermined quantity of material.

It is still another object of the present invention to provide means presenting highly simplified yet extremely efficient casting systems leading to reductions in the required numbers of operating personel and to increase in rates of production of finished articles.

A further object of the present invention is to provide means conducive to efficacious casting systems and procedures having application in the production of molds irrespective of the sizes of the molds or the characteristics of the materials employed.

Still a further object of the present invention is to provide means ensuring production of castings at a minimum cost due to substantial reductions in material wastages and equally substantial increases in the proportions of acceptable articles produced in each operation.

Another object of the present invention is the provision of means permitting to arrange a plurality of casting cavities within one single mold and to pour all casting cavities simultaneously from one single pouring ladle.

A further object of the present invention is the provision of means whereby a casting cavity may be poured simultaneously from a plurality of locations by means of one single pouring ladle.

Still another object of the present invention is to provide in the upper surface of a mold cope means to simultaneously direct a predetermined quantity of molten metal into a plurality of sprues in this cope in an uninterrupted and even flow.

Another object of the present invention is the provision of means facilitating the production of foundry molds and more particularly the production of copes in such molds.

A further object of the present invention is to provide method for the production of mold copes in a simple and efficient manner.

Another object of the present invention is the provision of a method conducive to the production of copes having cavities in their upper as well as in their lower surfaces.

Another object of the present invention is the provision of means permitting to form cavities in the upper surface of a cope in a foundry mold.

Still a further object of the present invention is to provide pattern means serving to produce a system of cavities in the upper surface of a cope permitting to deliver molten metal to a plurality of sprues simultaneously.

A further object of the present invention is the provision of means permitting to place pattern means for a system of cavities in the top surface of the cope onto pattern means forming the lower surface of this cope and to remove the first mentioned pattern means from above after the mold has been formed.

These and other objects will become further apparent from the following detailed description, reference being made to the accompanying drawings, showing preferred embodiments of the invention.

In the drawing,

FIG. 2a is a sectional detail view of a further embodiment of the invention.

FIG. 7 is a side view, partly in section, along line VII—VII in FIG. 5, and showing another step.

FIG. 8 is a side view in the direction of arrow A in FIG. 5, the top distributor pattern being removed from the mold.

FIG. 9 is a section taken along line IX—IX in FIG. 4.

FIG. 10 is a fragmentary section of a sprue pattern, the section being taken along line X—X in FIG. 5.

FIG. 11 is a fragmentary sectional view of a pouring basin taken along line XI—XI in FIG. 13.

FIG. 12 is a fragmentary sectional view of a pouring basin taken along line XII—XII in FIG. 13.

FIG. 13 is a plan view of the pouring basin of FIGS. 11 and 12.

FIG. 14 shows a modification of a top distributor system seen in top plan view.

FIG. 15 shows another modification of a top distributor system in top plan view.

FIG. 16 shows still another modification of a top distributor system in top plan view.

Referring now generally to the present invention, it will be seen that a mold is provided, in which the cope or upper half comprises in its top surface a pouring basin and a plurality of channel portions, the latter connecting said pouring basin with a plurality of sprues extending downwardly through the cope and communicating with a gate or runner system adjacent the parting plane of the mold. The system provided by the invention comprising said plurality of sprues, said channels and said common pouring basin therefore is hereinafter referred to as "top distributor system."

Similarly the pattern provided by the present invention for the forming of such top distributor system in the cope of the mold will subseqeuntly be referred to as top distributor pattern.

Figure 1:
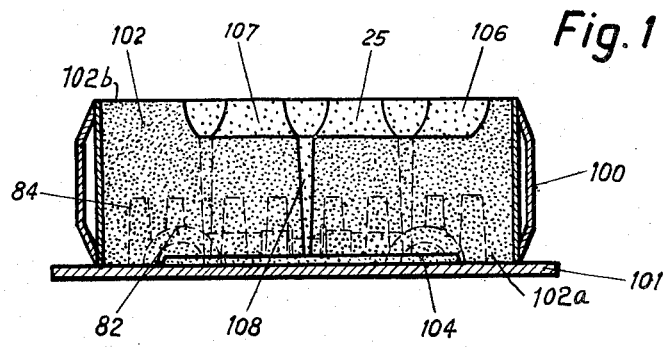
FIG. 1 shows the cope of a foundry mold embodying the invention in vertical section taken along line I in FIG. 2.
Figure 2:
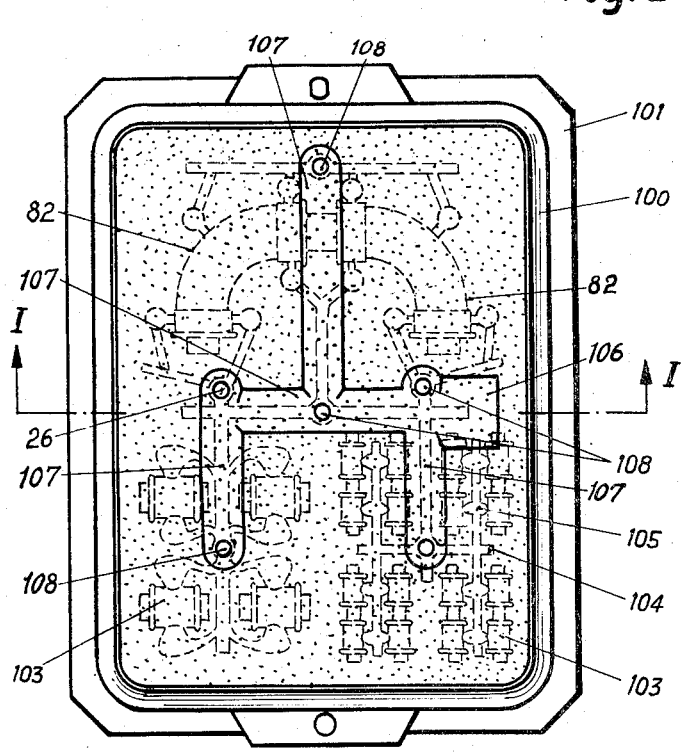
FIG. 2 is a plan view of the cope shown in FIG. 1.

Referring now more specifically to the drawing in which like or corresponding parts are designated with the same numerals throughout the figures thereof. In FIGS. 1 and 2 a flask 100 is shown to be supported on a plate 101 and to enclose a cope 102 of a foundry mold. A plurality of recesses are provided in the lower surface (forming the parting plane of a mold) and constitute the upper halves of mold cavities. These mold cavities include casting cavities 103, shown to be in the form of larger and smaller fittings, gate cavities 104 and feeder cavities 105 interconnecting casting cavities and gate cavities. In the upper surface 102b of the cope recesses have been provided to form a top distributor system. This top distributor system includes a pouring basin 106, a plurality of distributor channels 107 and a plurality of sprues 108. All of the sprues 108 are connected at their upper ends via the distributor channels 107 with the common pouring basin 106, while the lower ends of these sprues open into the gate cavities 104.

In FIG. 2a, a mold A having a cope of the type disclosed in FIGS. 1 and 2 is shown. The cope 102 rests on a drag 114. It will be seen that the cope surface of the mold is formed by the upper surface 102b of the cope while the lower surface 102a of the cope is situated in the parting plane P defined by cope and drag.

In use of a mold having a cope of the type shown in FIGS. 1 and 2, to produce castings, the molten metal is poured into the common pouring basin 106, from where this metal will be distributed to the respective sprues 108 via the distributor channels in an uninterrupted and a substantially even flow. Thus a plurality of sprues 108 will simultaneously (and from a common source) be supplied with molten metal. Therefore, all of the mold cavities will be filled at the same time. Thus the danger of explosive combustion of gas which is present in conventional molds due to non-simultaneous pouring through the different sprues, is positively avoided. In actual foundry practice the amount of molten metal required will be determined prior to the pouring operation especially if a number of equal molds are to be poured, as this may be the case in a semi- or fully automatic system. It will then be possible to fill one pouring ladle with this predetermined quantity of molten metal and to empty this ladle completely upon pouring of one single mold. The pouring operation and the weighing of a predetermined quantity may for instance be carried out with a device as described in our copending application Ser. No. 478,166, filed December 28, 1954 for Process and Means for Casting System for Operating Pouring Ladles.

Figure 3:
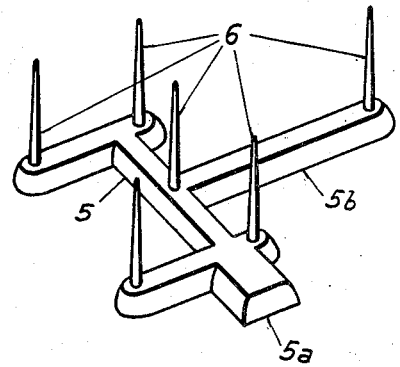
FIG. 3 is a perspective representation of a top distributor pattern used in connection with the cope shown in FIGS. 1 and 2, the pattern being shown in inverted position.

In FIG. 3 the top distributor pattern used in connection with the cope shown in FIGS. 1 and 2 has been illustrated schematically. The numeral 5 designates the pattern for forming the recesses in the upper side of the cope and including a portion 5a to form the pouring basin 106 and portions 5b to form the distributor channels 107. The rods 6 connected to pattern 5 and extending therefrom serve to form the sprues 108.

Figure 4:
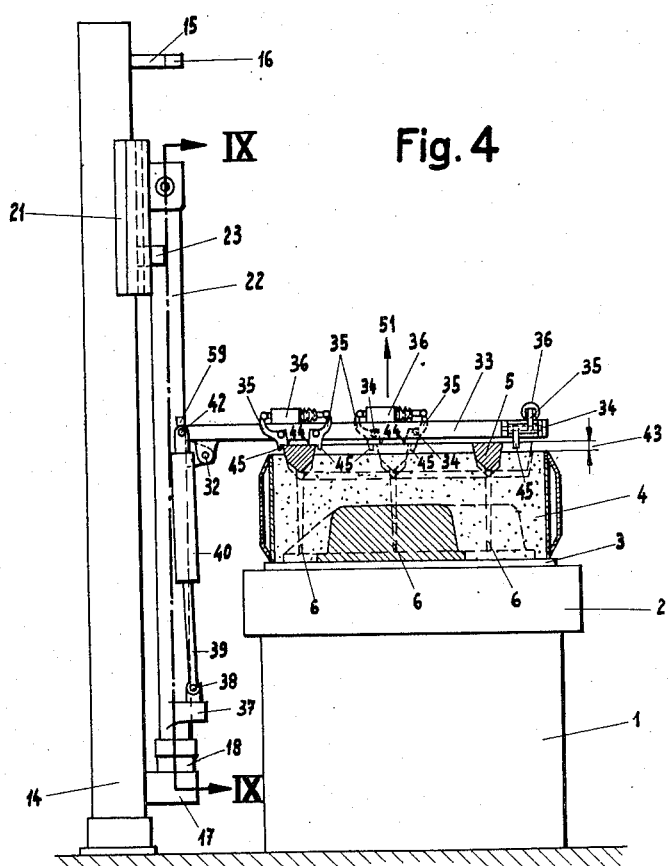
FIG. 4 is a side view of the device for handling the top distributor pattern in a molding machine; the mold being shown in section taken along line IV—IV in FIG. 5.

By means of its rods 6 the pattern 5 may be positioned and supported on the actual mold pattern, as shown for instance in FIG. 4.

A device for handling a top distributor system during molding is now described in connection with FIGS. 4 and 5.

Arranged on a molding machine 1 having a mold table 2 and a pattern plate 3 is a finally compacted mold 4. A top distributor pattern 5 of the type shown in FIG. 3 and provided with rods 6 is supported on the pattern plate 3 and rests thereon with these rods during molding.

Secured to a column 14 arranged adjacent molding machine 1 is a stop member 15 with an associated rubber buffer 16. Resting on a support 17 rigidly connected with the column 14 is an intermediate member 18, to which a tube 19 with a piston 20 at its upper end is mounted (see FIG. 9). Tube 19 and piston 20 project into a cylinder 22, which is guided so as to be vertically displaceable by means of lugs 23 in guides 21 secured to the column 14. The guides 21 also prevent the cylinder 22 from being horizontally rotated. Incorporated in the head of cylinder 22 is an adjustable piston 24 of which the vertical location can be altered by an adjusting spindle 25. If the crank 26 is axially displaced in the direction of arrow 27, it forces the bevel gear 28 out of engagement with the bevel gear 30 which is rigidly attached to the adjusting spindle 25, the movement being effected against the action of spring 29. If the crank 26 is rotated in this crank position, the bevel gear 31 which remains in engagement with bevel gear 30, will rotate as well. The adjusting spindle 25 displaces the adjusting piston 24 upwards or downwards according to its direction of rotation. After the adjustment, and when the crank 26 is returned, the spring 29 again forces the bevel gear 28 into engagement with bevel gear 30 and in conjunction with bevel gear 31 secures the bevel gear 30 against rotation.

Swivellably held on cylinder 22 by pivots 32 is a tilting arm 33. This tilting arm 33 is provided with pivots 34 on which twin clamping levers 35 are carried. Pivoted to the twin clamping levers 35 are pressure cylinders 36, which move the clamping levers into operative position when a pressure medium is supplied to them in known manner, and open the said twin clamping levers 35 by means of the incorporated piston springs (not shown) when the pressure medium is drained.

The cylinder 22 is provided with a bracket 37 to which the piston rods 39 of a pair of tilting cylinders 40 are connected by means of pivots 38. Rigidly connected to the piston rods 39 are pistons 41. The tilting cylinders 40 are hingedly connected to the tilting arm 33 by means of pivots 42.

Figure 5:
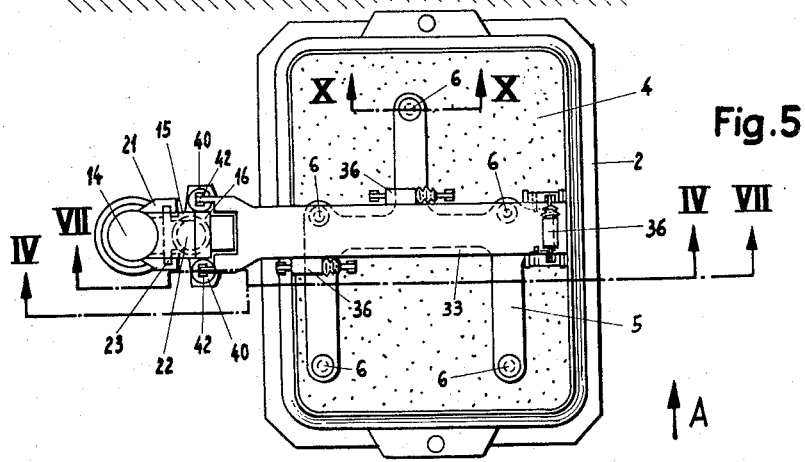
FIG. 5 is a plan view of the device of FIG. 4.

As will be noted from FIG. 10, which is a vertical section through the top distributor pattern taken along line X—X in FIG. 5, the rods 6 of this pattern are slidably guided within an extension sleeve 11 mounted in pattern 5. At its upper end rod 6 is provided with a shoulder 10 abutting against the upper end of sleeve 11 under the action of a spring 8 arranged in a spring sleeve 9. The latter is screwed into pattern 5 from above and serves at the same time to secure extension sleeve 11. The purpose of the slidable spring loaded arrangement of rods 6 will become apparent below.

The operation of the device described will now be explained in conjunction with the method for the production of copes including a top distributor system.

Referring again to FIG. 4, in which a finally compacted cope of a foundry mold is positioned on mold table 2, the tilting arm 33 is in its lower horizontal position. In this position this arm is immediately above the top distributor pattern, which latter is in its raised position under the action of its springs 8, i.e. in a position in which it projects beyond the top surface of the cope. The twin clamping levers 35 take up their opened position.

The stop faces 44 engage the pattern 5 while the clamping faces 45 are spaced from the said pattern. By actuation of a valve (not shown) the pressure line 46 (FIG. 7) and the pressure cylinders 36 are supplied with pressure. The twin clamping levers 35 are actuated and the clamping faces 45 engage the pattern 5 and hold it securely. Actuation of a further valve (not shown) supplies pressure to pressure line 47, the tube 48, bore 49 and the cylinder chamber 50 of cylinder 22, and lifts the cylinder 22 with all associated members including the tilting arm 33 and the clamped pattern 5 in the direction of arrow 51 into the position shown in FIG. 7. The tube 52 (FIG. 9) limits the lifting path by engagement with the piston 20. Actuation of a further valve (not shown) releases the pressure from pressure line 53 and from the bores 54 and cylinder chambers 55, and at the same time supplies pressure to the pressure line 56 and the spaces 57 below piston 41. This actuates the tilting cylinders 40 and the tilting arm 33 swings into the position shown in FIG. 8 in the direction indicated by arrow 58 in FIG. 7. The tilting arm 33 and the clamped pattern 5 then strike against the rubber buffers 16 so that sand remaining on the pattern 5 is shaken off.

The finished cope 4 from which the top distributor pattern has been removed may now be lifted off the mold table. After cleaning of the pattern plate 3, an empty flask may again be placed thereon. Subsequently the top distributor pattern is again applied to the pattern plate 3 as follows:

Actuation of a corresponding valve causes the pressure to be released in pressure line 56 while the pressure line 53 becomes operative. The tilting arm 33 moves from the position shown in FIG. 8 back into the position shown in FIG. 7 in the direction opposite to that of arrow 58, and abuts at the top 59 which is firmly connected with the cylinder 22. Actuation of a further valve releases pressure from the pressure line 47, the piston chamber 50 becomes pressureless and the cylinder 22 with all members arranged on its drops into the position shown in FIGS. 4 and 9 under its own weight, the piston 20 abutting against the adjustable piston 24 while the rods 6 of the pattern 5 come to rest on the pattern plate 3. Actuation of a valve (not shown) releases the pressure from pressure line 46 and from the pressure cylinders 36, the twin clamping levers 35 open and the pattern 5 is released. The empty tilting arm 33 is first raised in the direction of arrow 51 as described, and then tilted in the direction of arrow 58 until the said arm 33 engages rubber buffer 16.

Figure 6:
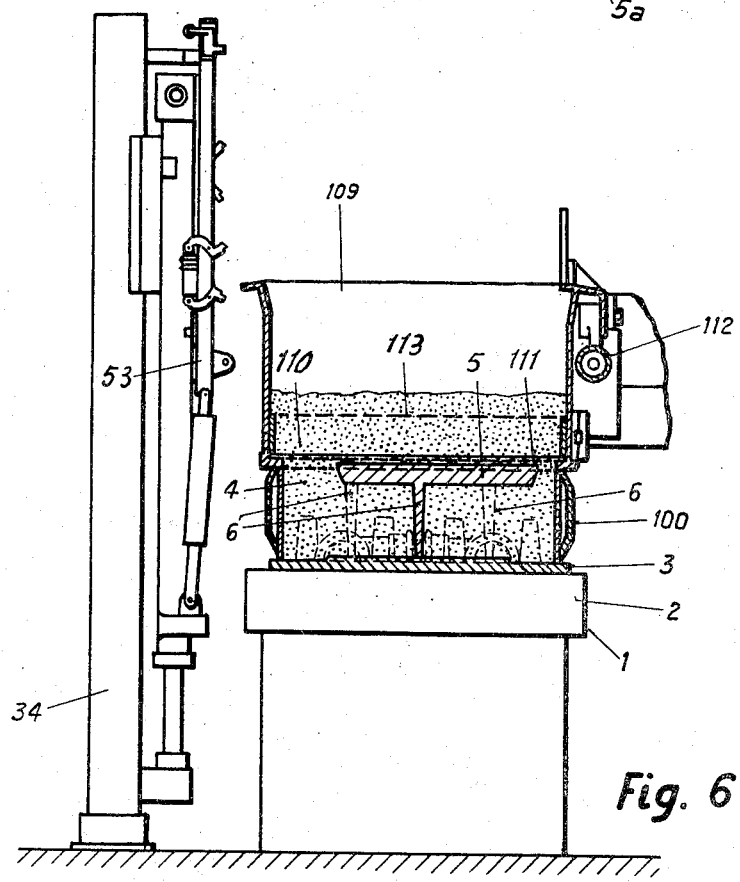
FIG. 6 is a representation of a step in the production of a cope.

Since the tilting arm 33 now takes up the position shown in FIG. 6, i.e. does not obstruct the upper side of the flask 100, a sand hopper 109 may now be placed onto this flask. This sand hopper is filled with molding sand 110, which may be discharged through a hatch 111 at its bottom. The latter may be opened and closed by means of a pneumatic cylinder and piston device schematically indicated at 112.

The hatch 111 may be formed by two cooperating plate members 113. The quantity of sand contained in the hopper exceeds the quantity required for the finished cope. When the hatch 111 is opened the sand in the hopper will flow into the flask and fill the latter completely, the top distributor pattern thereby being embedded within the sand. The sand hopper will, however, not be empty as yet. With the sand in the flask above the patterns of match or pattern plate 3 and the hopper placed on the flask, this sand may now be precompacted such as by jolting for instance in a manner described in United States Letters Patent No. 2,792,601. During this jolting operation a portion of the sand still in the hopper will flow down into the flask, to compensate for the compaction of the sand in latter such as to maintain the flask completely filled. After such precompaction the hatch in the hopper will be closed, whereby the top layer of sand above the rim of the flask 100 is shaved off by means of the plate members 113. When shaving off this sand layer, which constitutes the excess sand, the volume reduction of the sand in the flask upon final compaction is taken into consideration so as to leave a quantity corresponding to this reduction above the rim of the flask. In the embodiment shown in FIG. 6, this is effected by spacing the hatch, i.e. the plate members 113 thereof a predetermined distance above the rim of the flask 100, the distance corresponding to the wall thickness of the hopper 109 at its bottom portion.

After the excess sand has been shaved off, the hopper 109 may be removed from the flask. Subsequently final compaction of the sand in the flask, for instance by jolting and squeezing as described in our copending application 423,786, filed April 16, 1954, for Moulding Machine for the Jolting, Squeezing, or the Simultaneous Jolting and Squeezing of Moulds, now U.S. Patent No. 2,892,223, granted June 30, 1959, or any other known method, be effected. During final compaction the top distributor pattern 5 will under pressure be downwardly displaced against the action of springs 8, to be flush with the top surface of the finally compacted cope. When the pressure is relieved, i.e. when the squeezing unit is lifted off from the top of the cope, the top distributor pattern 5 will again be raised into the position shown in FIG. 4 under the action of its compressed springs 8. The pattern 5 will thus project by a distance 43 over the top surface of the cope.

Thereafter, this pattern may be engaged by the clamping levers 45 and removed from the cope in the manner previously described. The operation cycle for forming a cope of a foundry mold may be repeated after the finished cope 4 has been removed.

In connection with FIGS. 11 to 13 a number of measures are described, which may serve for improvement of the pouring operation in a mold of the type disclosed. The cope 102 shown in FIGS. 11, 12 and 13, has a pouring basin 106, a grill 114, and a rib insert 115. Experiments have shown that it is difficult to pour a large quantity of metal into a pouring basin without creating a great deal of turbulence in the channels 107, leading from the pouring basin to the corresponding sprues 108, even considering a relatively low drop height of the pouring jet.

Further tests have shown that pouring through a grill 114 or suitable other arrangement considerably steadies the whole casting process because the force of the casting jet will spend itself to some extent in the pouring basin 106. The best result is obtained with a screen, which, however, is not suited for the pouring of iron and steel, for technical reasons. However, such a screen may be used when casting light metals or other materials having a relatively low melting point. Experiments have also shown that one or more ribs 115 smooth the flow further as the molten metal enters the pouring basin 106 and as it passes through the various channels 107 to the corresponding sprues or openings.

Tests have further demonstrated that a grill 114 in combination with ribs 115 renders the possibility of a nearly turbulence-free, slow flow of the molten metal from the casting basin 106 through the channels to the corresponding sprues. As a result, pouring may be done rapidly without danger of an overflow action of the molten metal. Any slag carried along, is swiftly deposited on the surface of the molten metal in said channels, 5.

FIGS. 14 to 16 show three modified forms of a top distributor system, FIG. 14 illustrating a casting basin 106, covered by a grill 114 and two sprues 108, FIG. 15 showing a system with four sprues and FIG. 16 a system with six sprues.

As may be seen from FIGS. 14 to 16, this technique permits pouring from any desired number of sprue openings in any arrangement in line with the layout of the pattern plate. In practice, a relatively few, standardized forms of top distributor systems have been found adequate for all variations in pattern plates, which may occur.

It has been found especially advantageous to enlarge the cross sections of the channels so much over that required for the passage of the corresponding amount of metal that the volume of the top distributor system is at least equal to the difference between the entire volume of the metal to be poured and the volume of metal which has already flowed through the sprue openings upon emptying the casting ladle, which may take place at any desired speed. As a result, the pouring process to a first approximation resembles the known procedure of pouring molten metal through a pouring basin fitted with a sprue plug as encountered in large-scale foundries. Another advantage is that the process of emptying the contents of the casting ladle into the trough system is largely independent of the flow of the molten metal from the trough system into the individual sprues. This is an important prerequisite for the automatic filling of molds.

A number of small sub-molds (pattern plates) with their individual sprues may be combined into a larger mold and jointly molded and poured by means of a casting basin of adequate size that can every time be suitably placed centrally near the longitudinal edge of the mold. This offers the advantage that the pouring from the casting ladle can be done at a lever ensuring minimum of height for pouring.

Through an arrangement of grills, ribs or similar devices in the pouring basin, the remaining unavoidable portion of the pouring jet's force is largely eliminated or braked, whereby a basic prerequisite for the smooth flow of the molten metal into the various sprue openings is met.

Since the path between the casting basin and the individual sprue openings is sufficiently long, and inasmuch as during pouring operations the velocity of flow in the troughs or channels which connect the casting basin with the sprue openings is relatively low, slag that may be carried along is allowed to float to the surface of the molten metal accumulating in the trough system. Furthermore, inasmuch as slag that may float in a casting ladle will flow off only once the casting ladle has been partly emptied, because it shifts in the course of tilting, as tests show, all sprue openings are then already covered up with molten metal, so that the slag now flowing off is certain to be floating on the surface. Thus, the need for special slag runs is done away with.

Since the amount of metal poured is such as to fill the mold cavities just up to the top of the sprues and since moreover there are no special slag runners, and no metal remains in the top runner trough, the yield is materially improved because the weight of the slag runs and the weight of the sprue-opening gates are eliminated.

The top distributor system permits placement of the sprues on the pattern plate in a manner which is best adapted to the pouring of a casting. This and the elimination of the slag runs, which are usually extensive and bulky, have the particular advantage that a given pattern-plate area will accomodate more patterns than heretofore, so that the casting weight per molding flask and the casting production per hour may be increased. The greater latitude in the placement of the pouring sprues and the more uniform filling level of the metal in the trough system results in less waste in non-run castings. Since the capacity of the distributor system may, within certain limits, be as large as desired,, the pouring operation may be carried out in such a manner that the entire contents of the pouring ladle are simply poured into the system, while the actual process of pouring the mold, the downflow through the individual sprues into the mold cavities, takes place automatically, under constant pouring pressure and under most favorable conditions. In this connection it is to be noted that the sprue openings may all be removed from the pouring basin, so that a direct pouring into a sprue, with the undesirable pressure increase, may be avoided.

The relatively heavy molten-metal load in the aforesaid system facilitates maintaining a constant filling level above the sprue openings, which under conventional methods proved difficult because of fluctuations in the quantity of the outflow throughout the entire pouring time. Pouring exactly as much metal from the casting ladle as flows off through the sprue openings so as to keep the casting basin constantly filled, and to stop pouring at the precise moment when filling has been completed so as not to spill extraneous metal unnecessarily, are requirements which were nearly impossible to fulfill under the known casting method, but which are met in every respect and readily maintained in the system herein described.

The radically simplified casting operation requires from the operator, if one is still needed, considerably less strain than the known method. Pouring holds less danger of accident, too, as the molten metal splashes less and since an overflow at the end of the filling operation is made impossible.

If a mold to be poured consists of several sub-molds or individual casting cavities with corresponding sprues, the flow of molten metal enters the individual sub-molds almost simultaneously. Injuries of the mold through explosions due to the formation of gases, and their ill effects on the casting, are therefore eliminated.

As the mold according to the invention lends itself to the simultaneous pouring of smaller castings as well as for large molds of the most widely different types and with the most widely different filling requirements, the pouring operation consists largely of a rapid pouring of the molten metal from the pouring ladle into the trough system (regardless of the required pouring speed, which is determined by the cross-sectional area of the sprue openings). Moreover, the mold according to the present invention meets the requirements of automatic pouring due to the fact that the pouring basin may for a wide variety of molds be located in one and the same desired or predetermined location, since the location of the pouring basin has no influence whatsoever on the location of the sprues in the mold.

As a result of the mold according to the present invention permitting an increased quantity of molten metal to be poured from one ladle per time unit, the average drop in the temperature between the time when the molten metal leaves the melting aggregate and the time when it enters the mold is substantially reduced, so that the casting metal does not have to be overheated as heretofore required.

Thus, the over-all result of the invention described herein resides in a better quality of castings, substantially improved production and, in the case of fully automatic operation, complete elimination of a crew, or, in the case of semi-automatic operation, a pouring efficiency increased several times, as well as an increase of production efficiency.

The device shown in FIGS. 4 through to FIG. 10 for lifting a top distributor pattern can also be employed on moulding machines having rotary tables carrying several pattern stations. In this case each pattern station must have a particular device for lifting the top distributor pattern. The column 14 is advantageously arranged on the rotary table so that the device for lifting the pattern positively rotates with the pattern station. Actuation of the control valves may be effected manually or by means of control drums in the known manner. The lifting and possibly the lowering movements of the cylinder 22 can be braked in the known manner so as to be smooth by means of dashpots.

Various other changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A mold for foundry purposes having a parting plane defining a cope and a drag and including gate cavities and casting cavities in communication with said gate cavities, both of said cavities opening into said parting plane, said cope having a lower surface situated in said parting plane and an upper surface above said parting plane, said cope comprising a plurality of sprues extending therethrough and having upper and lower ends, said sprues being connected over their lower ends with said gate cavities, a recess provided in said upper surface at a location remote from said sprues and forming a pouring basin, and channel means in said upper surface and connecting said pouring basin with respective ones of said sprues, at said upper ends of the latter, to thereby permit simultaneous distribution of molten metal, when poured into said basin, to said respective sprues via said channel means.

2. A mold according to claim 1, wherein said channel means extends substantially parallel with respect to the upper and lower surface of the cope.

3. A mold for foundry purposes having a parting plane defining a cope and a drag and including gate cavities and casting cavities in communication with said gate cavities, both of said cavities opening into said parting plane, said cope having a lower surface situated in said parting plane and an upper surface above said parting plane, said cope comprising a plurality of sprues extending therethrough and having upper and lower ends, said sprues being connected over their lower ends with said gate cavities, a recess provided in said upper surface at a location remote from said sprues and forming a pouring basin, means for influencing the flow of molten metal in said pouring basin, and channel means in said upper surface and connecting said pouring basin with respective ones of said sprues, at said upper ends of the latter, to thereby permit simultaneous distribution of said flow of molten metal when poured into said basin to said respective sprues via said channel means, said flow influencing means substantially reducing the turbulence of flow of said molten metal when distributed by said channel means.

4. A mold according to claim 3, said means for influencing the flow of molten metal including a grill arranged to extend across said pouring basin.

5. A mold according to claim 3, said means for influencing the flow of metal including an upstanding rib member arranged within said pouring basin.

6. A mold comprising a parting plane defining a cope and a drag and including a gate cavity and a casting cavity in communication with said gate cavity, both of said cavities opening into said parting plane, said cope having a lower surface situated in said parting plane and an upper surface above said parting plane, said cope including a plurality of sprues extending therethrough and having upper and lower ends, said sprues being connected over their lower ends with said gate cavity, said upper surface having a recess therein forming a pouring basin, and channel means in said upper surface and connecting said pouring basin with said sprues.

7. A mold comprising a parting plane defining a cope and a drag and including a gate cavity and a casting cavity in communication with said gate cavity, both of said cavities opening into said parting plane, said cope having a lower surface situated in said parting plane and an upper surface above said parting plane, said cope including a plurality of spaced apart sprues extending therethrough and terminating in upper and lower ends, said sprues being connected via their lower ends with said gate cavity, said upper surface having a recess therein forming a single pouring basin, and further branched channel means located in and extending substantially parallel to said upper surface and connecting said plurality of sprues with each other and with said pouring basin, the branches of said channels being of considerable cross-section as compared to the diameter of each of said sprues.

8. A mold according to claim 7, wherein said sprues are arranged in staggered relationship in relation to said pouring basin.

9. A mold according to claim 7, wherein said sprues are located at a considerable distance from said pouring basin.

References Cited in the file of this patent

UNITED STATES PATENTS

| | | |
|---|---|---|
| 386,951 | Adams | July 31, 1888 |
| 408,579 | Carr | Aug. 6, 1889 |
| 521,450 | Adams | June 19, 1894 |
| 521,451 | Adams | June 19, 1894 |
| 903,605 | McClelland | Nov. 10, 1908 |
| 1,657,952 | Zoda | Jan. 31, 1928 |
| 1,717,245 | Patterson | June 11, 1929 |
| 2,070,821 | Badger | Feb. 16, 1937 |
| 2,469,062 | Begtrup | May 3, 1949 |
| 2,621,381 | Johnson | Dec. 16, 1952 |

OTHER REFERENCES

Modern Metals, Nov. 1946, page 20, 22–134.
Foundry Work, American Technical Society pp. 49–50, 1943.
Foundry Work, Edwin W. Doe, pp. 22–27, 1951.
The Foundry, Oct. 1948, pages 68–83.
Principles of Metal Casting, McGraw-Hill Book Co. pages 207–208, 1955.
Foundry Work pp. 29 and 30, American Technical Society 1943.
Iron & Steel Engineer page 57, Sept. 1946.